W. H. McGOWEN.
RIM LOCKING ATTACHMENT.
APPLICATION FILED MAR. 5, 1921.
1,426,307.
Patented Aug. 15, 1922.
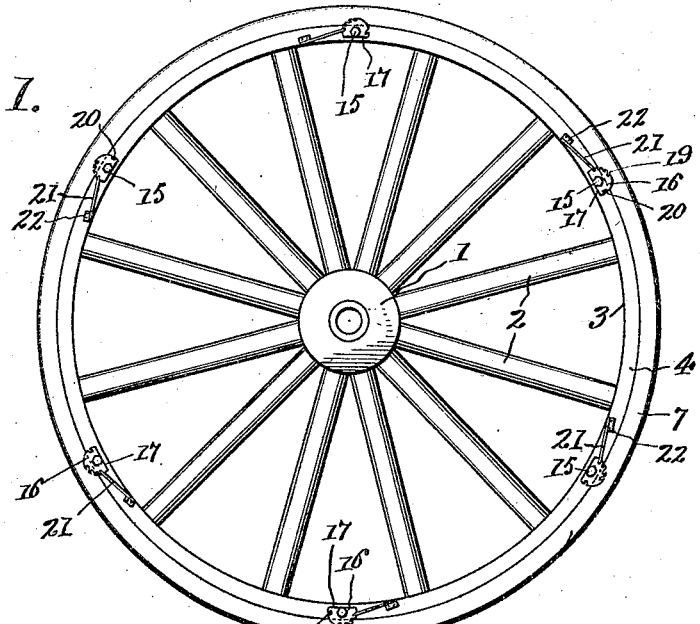
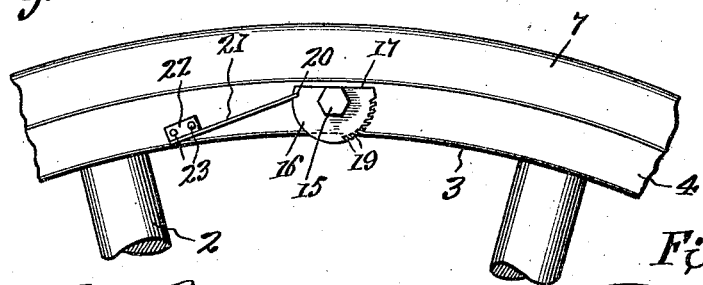
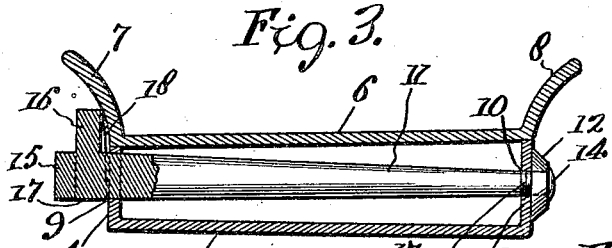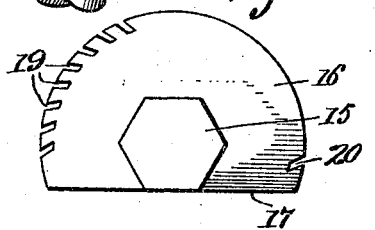
Inventor
W. H. McGowen
by Wilkinson & Giusta
Attorneys.

UNITED STATES PATENT OFFICE.

WILLIAM H. McGOWEN, OF VINCENNES, INDIANA.

RIM-LOCKING ATTACHMENT.

1,426,307.   Specification of Letters Patent.   Patented Aug. 15, 1922.

Application filed March 5, 1921. Serial No. 449,604.

*To all whom it may concern:*

Be it known that I, WILLIAM H. Mc-GOWEN, a citizen of the United States, residing at Vincennes, in the county of Knox and State of Indiana, have invented certain new and useful Improvements in Rim-Locking Attachments; and I do hereby declare the following to be a full, clear, and exact description of the invention, such as will enable others skilled in the art to which it appertains to make and use the same.

The present invention relates to improvements in rim locking attachments for automobiles and other vehicle wheels, and has for an object to provide for the attachment and detachment of demountable rims from wheels without the necessity of removing the locking means from the wheel.

Another object of the invention resides in providing a simple and inexpensive construction of lug permanently attached to the vehicle wheel, which upon rotation may be brought into operative and inoperative positions with respect to the demountable rim, and which further includes a latch for holding the lug in either position and for allowing of its adjustability with reference to the rim.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a view in side elevation of a wheel equipped with lugs constructed according to the present invention and showing the lugs in the locking position with the rim held thereby;

Fig. 2 is an enlarged fragmentary sectional view of a portion of the wheel and demountable rim with one of the lugs shown in the inoperative position;

Fig. 3 is a transverse sectional view through the felly and demountable rim and showing the locking device partly in elevation and partly in section;

Fig. 4 is a plan view of the locking lug;

Fig. 5 is a bottom plan view of the locking attachment; and

Fig. 6 is a top plan view of the same.

Referring more particularly to the drawings, 1 designates the hub, 2 the spokes, and 3 the felly of an automobile or other vehicle wheel. As shown more particularly in Fig. 3, the felly is of a channel construction having the outer flange 4 thereof made of lesser height than the inner flange 5. At 6 is represented the demountable rim preferably made inclined in a transverse direction so as to rest at its edges upon the outer edges of the flanges 4 and 5. The demountable rim 6 is in the usual manner formed with flanges 7 and 8 for confining the beads of the tire therein.

At suitable points the flanges 4 and 5 of the felly 3 are provided with coaxial openings 9 and 10 having smooth walls, the openings 9 being larger than the openings 10 in order to receive the larger end portions of tapering bolts 11 which are journaled for rotary movement in these openings. These openings may be provided in any suitable number, five such openings with a like number of locking lugs being shown in Fig. 1. This is merely by way of example as a greater or less number of the locking devices may be used.

The tapering bolts 11 are held in place by nuts 12 run upon the threaded projecting ends 13 of the bolts, the outer extremities of the bolts being upset as indicated at 14 against the adjacent faces of the nuts 12. This permits the nut 12 to turn with the bolt 11 or in any event to prevent its being run off the threaded end 13 when the bolt 11 is rotated in a manner hereinafter described.

The larger end of the bolt extends beyond the flange 4 of the felly 3 and its outer extremity is formed into a nut head 15 adapted to receive a wrench or other tool employed to effect the rotation of the bolt. Inwardly of the nut head 15 is provided the locking lug 16 which is made integral with the bolt and of a semicircular or segmental form as indicated in Figs. 2 and 4, one side or a portion thereof being removed to provide a straight edge 17 coinciding with a chord of the circle on which the lug is struck. This straight edge 17 is adapted to come within the innermost circle of the demountable rim 6 as indicated in Fig. 2 when the bolt 11 is turned to one position so as to permit the ready removal of such demountable rim from the wheel. When the bolt 11 is rotated through a half revolution the unremoved portion of the lug is brought in front of the outer flange 7 of the demountable rim 6 and acts to confine the demountable rim on the wheel.

As shown more particularly in Figs. 5 and 6, the inner face of the lug 16 is inclined or cammed as indicated at 18 so that, as the lug 16 is rotated, the face 18 will gradually cam the demountable rim inwardly, acting to wedge the same upon the relatively inclined outer edges of the flanges 4 and 5 of the felly 3. In the outer edge of the lug 16 are made at one side a series of inclined notches 19, while at substantially a diametrically opposite point is a single recess 20. Both the notches 19 and recesses 20 are adapted to receive the free end of a resilient pawl or dog 21 having an overturned angled portion 22 secured as by fastenings 23 to the outer flange 4 of the felly 3.

In use, the device, when in the operative position, is in the position shown in Fig. 1, the five lugs being turned so as to extend against the outer flange of the demountable rim 6, thus confining the same in place, and in these positions of the lugs, the pawl or dog 21 lies in one of the series of notches 19. These series of notches, in combination with the cammed inner face 18 provides for holding the lug at a variety of positions so that the demountable rim may be cammed in to a greater or less degree.

As wear occurs for instance the lug 16 may be moved to a new angular position and the dog engaged with the next subsequent notch 19. By applying a tool to the nut head 15 a rotary movement of the lug may be accomplished to bring it to the position indicated in Fig. 2 whereupon the rim is free to be pulled axially from the wheel. In this position the dog 21 occupies the notch 20 for the purpose of holding the lug in this position. All of the lugs can therefore be set in this inoperative position so that their various locations around the wheel will not effect their accidentally swinging into the path of the rim. The hands are consequently left free to draw the rim outwardly and from the wheel.

While I have shown and described the invention in connection with a channel shaped rim, it is to be understood that the invention is equally applicable to the Firestone type which uses the wooden felly and wedge ring, or to other forms of fellies and wheels.

It is obvious that various changes and modifications may be made in the details of construction and design of the above specifically described embodiment of this invention without departing from the spirit thereof, such changes and modifications being restricted only by the scope of the following claim.

What is claimed is:—

In combination with a vehicle wheel having a felly of channel construction provided with an outer flange and an inner flange, said inner flange being of greater height than the outer flange, a demountable rim having flanges adapted to register with the outer edges of the flanges of said felly, a plurality of tapering bolts journaled to rotate in the flanges of said felly, means for permanently holding said tapering bolts in said flanges, the outer ends of the bolts projecting beyond the outer flange of the felly and provided with nut heads thereon, lugs made integral with the bolts inwardly of the nut heads and provided with cammed inner faces for engaging the outer flange of the demountable rim, the lugs being provided with removed portions adapted to permit of the passage thereover of the demountable rim, the edge of said lugs being provided with a series of notches at one side and with recesses at the opposite side, and a yieldable dog adapted to enter said recesses and a selective notch, substantially as described.

WILLIAM H. McGOWEN.